UNITED STATES PATENT OFFICE.

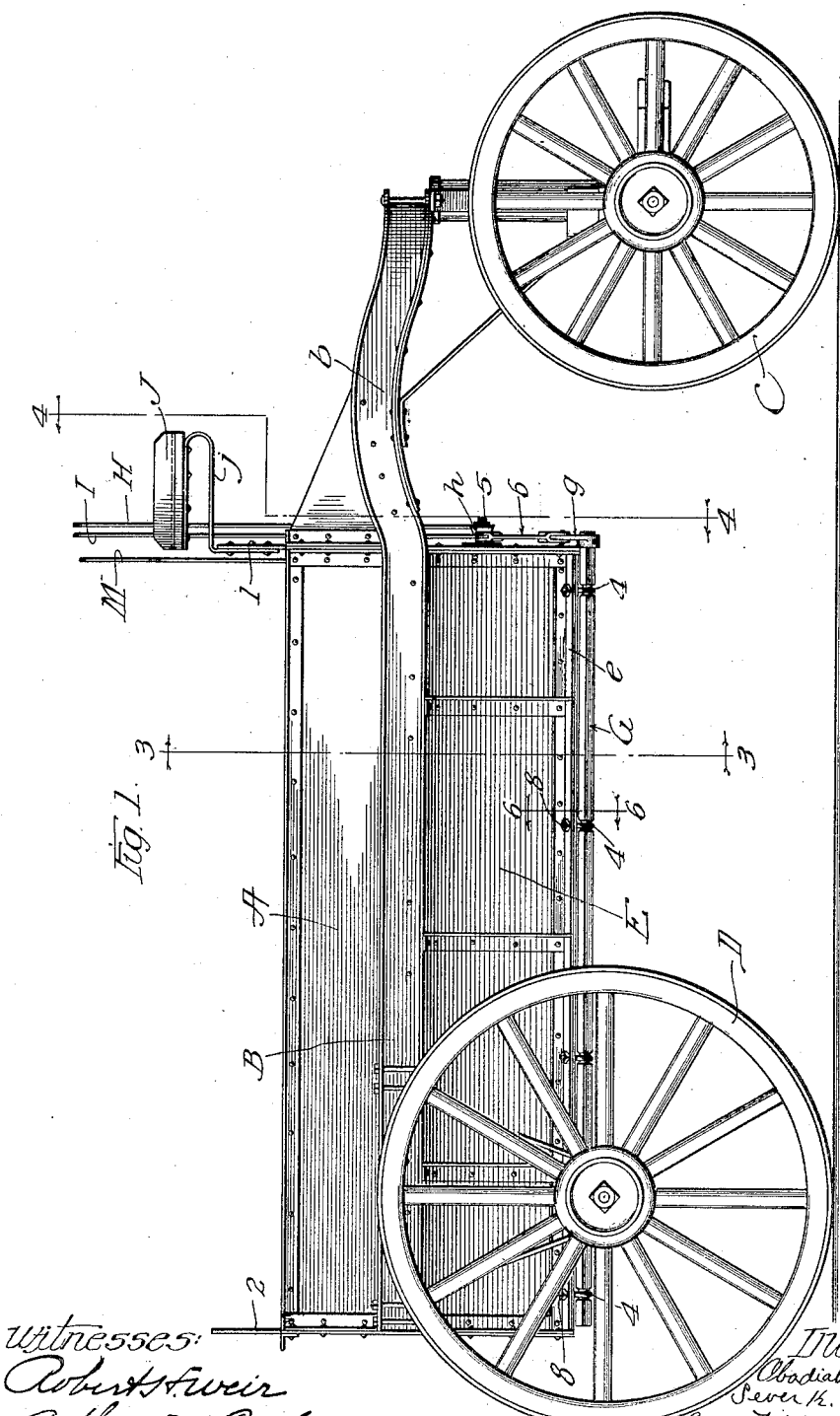

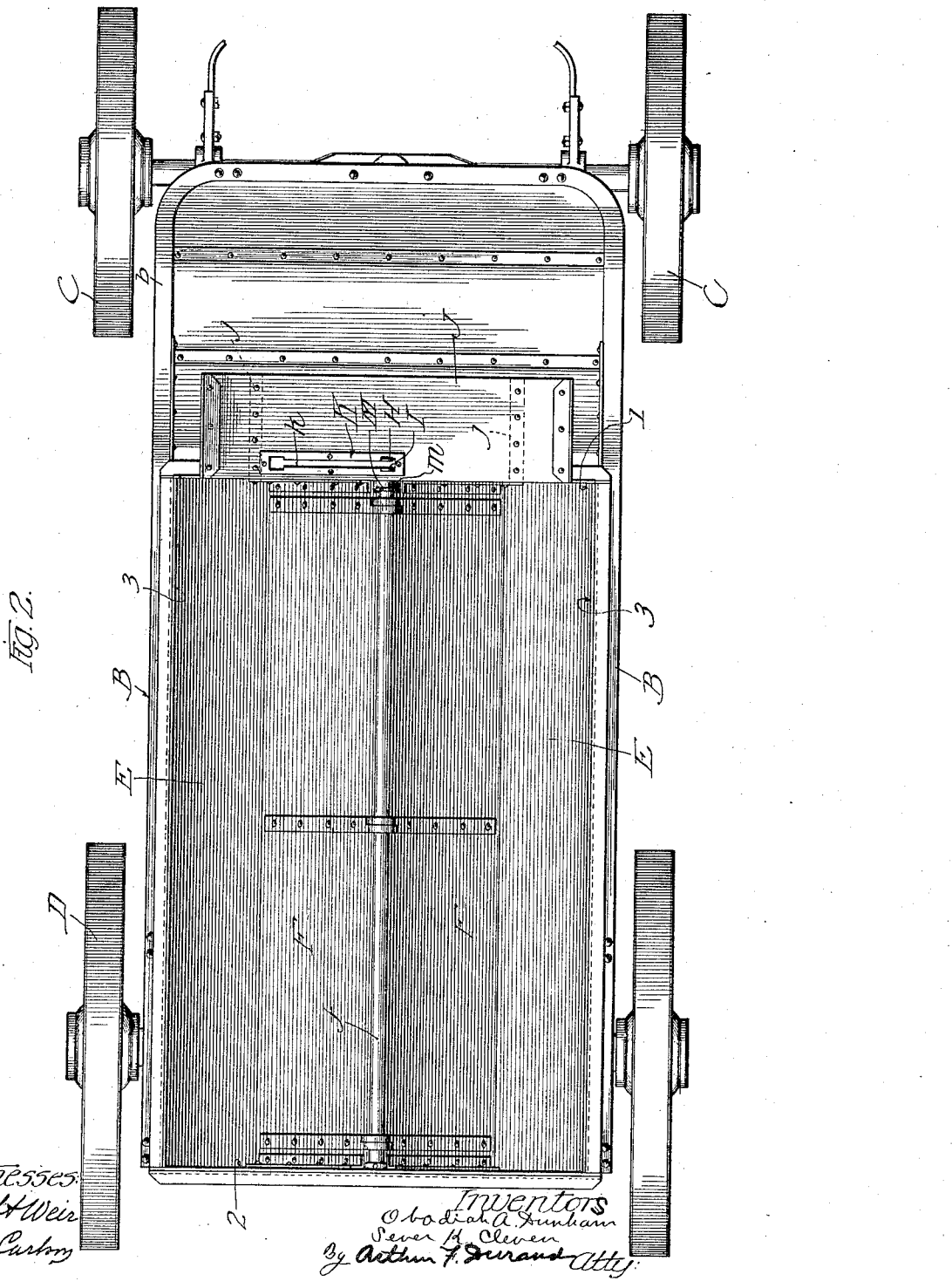

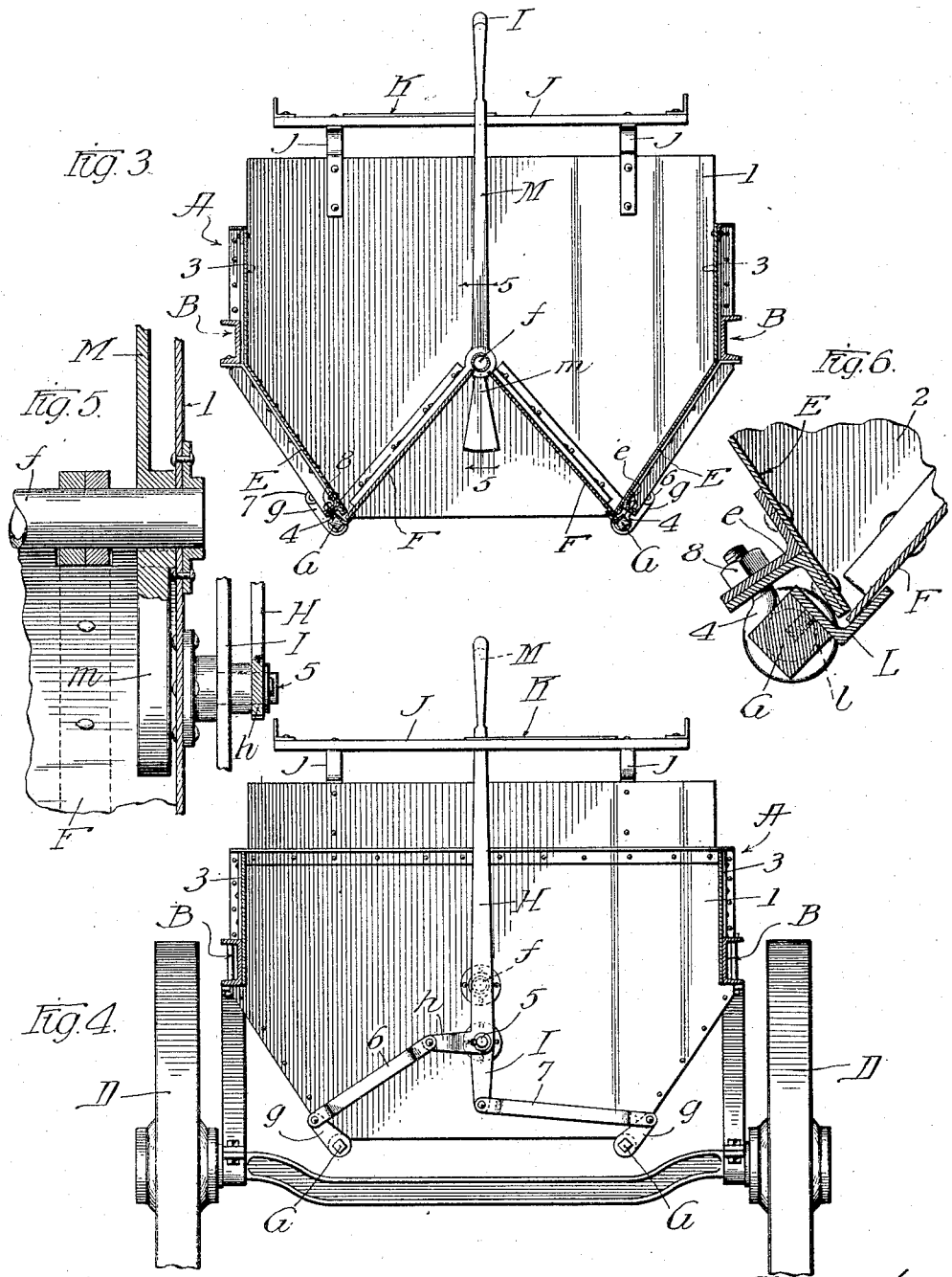

OBADIAH A. DUNHAM AND SEVER K. CLEVEN, OF MANCHESTER, IOWA, ASSIGNORS TO MANCHESTER MACHINE COMPANY, OF MANCHESTER, IOWA, A CORPORATION OF IOWA.

DUMP-WAGON.

1,197,356.  Specification of Letters Patent.  Patented Sept. 5, 1916.

Application filed September 18, 1915. Serial No. 51,311.

*To all whom it may concern:*

Be it known that we, OBADIAH A. DUNHAM and SEVER K. CLEVEN, citizens of the United States of America, and residents of Manchester, Iowa, have invented a certain new and useful Improvement in Dump-Wagons, of which the following is a specification.

Our invention relates to dump wagons of that kind in which doors are provided in the bottom of the body to dump the load.

The object of our invention is to provide a practical and satisfactory dump wagon in which the body is provided with inclined doors and bottom walls forming two parallel compartments or pockets which can be opened separately to dump one half the load at either side.

It is also an object to provide certain novel details and features of construction and combinations tending to increase the general efficiency and desirability of a dump wagon of this particular character.

To these and other useful ends, our invention consists in matters hereinafter set forth and claimed.

In the accompanying drawings Figure 1 is a side elevation of a dump wagon embodying the principles of our invention. Fig. 2 is a plan of the said dump wagon. Fig. 3 is a vertical transverse section on line 3—3 in Fig. 1. Fig. 4 is a section on line 4—4 in Fig. 1. Fig. 5 is an enlarged detail section on line 5—5 in Fig. 3. Fig. 6 is an enlarged detail section on line 6—6 in Fig. 1.

As thus illustrated, our invention comprises a body A supported by a frame B on the wheels C and D at the front and rear of the wagon. The said body is provided with front and rear end walls 1 and 2, and with vertical side walls 3, the frame B having the parallel side portions thereof suitably attached to the walls 3 of the body. In this way the body is carried in a suitably elevated position, and the front wheels C can swing under the forward portion $b$ of the frame in turning the wagon to right or left. The bottom of the body, which is W-shaped in cross section, as shown in Fig. 3, is formed by the inclined bottom walls E and the inclined doors F, it being observed that the two compartments or pockets thus formed extend longitudinally of the wagon.

It will also be seen that the lower edges of the sides 3 are substantially in the plane of the upper edges of the doors F, so that said bottom walls have a long incline, at a steep angle, which insures a fast discharge and the deflection of the load to the center under the wagon when either door is opened alone. A pipe or other cylindric member $f$ has its front and rear ends suitably mounted on the front and rear end walls 1 and 2, being disposed substantially midway between the sides of the body. The upper edges of the doors F are suitably hinged on this pipe or supporting member $f$, and with this arrangement the two doors swing together when released, thus dumping the load on the longitudinal center line of travel. The inclined bottom walls E are reinforced by angle irons $e$ which extend along the lower edges thereof, and eye-bolts 4 are removably secured to these angle irons to provide bearings for the rock shafts G, which latter are in the form of square rods having rounded or cylindrically reduced portions which engage said eye-bolt bearings. The forward ends of these shafts G are provided with crank-arms $g$, and a pair of levers H and I are pivoted at 5 upon the forward surface of the front wall 1 of the wagon body. The lever H has its lower end provided with a bell-crank arm $h$ which is connected by a link 6 with the crank arm $g$ of one of said rock shafts. The lower end of the lever I is connected by a link 7 with the crank arm $g$ of the other rock shaft. A seat J is supported by brackets $j$ on the front wall 1 of the body and is provided on the upper surface thereof with a slotted plate K for the two hand levers H and I, the slot $k$ of said plate extending transversely of the wagon from a point over the center thereof to a point substantially over the rock shaft of the link 7, and the ends of this slot being slightly enlarged to provide shoulders for locking said levers at either end of the slot, it being understood that the said levers are adapted to be flexed slightly toward and away from each other to disengage them from said locking shoulders. To hold the doors F in closed position, angle pieces L are secured by screws $l$ to the rock shaft G, these angle pieces being sections of angle iron of a length to extend between the eyebolt bearings 4 of said shafts. These angle pieces L swing upward and lockingly engage the lower edge portions of the two doors F, when the hand levers H and I are moved to their upright or normal position, as shown in Fig. 4, thereby very tightly locking and sealing the lower edges of the doors. By removing the nuts 8 of said eyebolt bearings the latter and the said rock shafts G can be readily detached from the structure of the wagon bottom. The two levers H and I are, it will be seen, easily and conveniently operated by the driver occupying the seat. To open the doors both levers H and I are pushed to the other end of the slot $k$, and toward the left-hand side of the wagon.

The means for closing the doors consists, preferably, of a hand lever M mounted on the axis member 5, immediately inside of the front wall of the wagon body, and provided at its lower end with a weighted portion $m$ which stands midway between the two doors when the lever is in vertical position. The upper end of this lever M is disposed immediately behind the driver's seat J, and by swinging this lever to either side the weighted lower end portion $m$ thereof will be brought into engagement with the lower surface of one of said doors. In this way the lever M can be employed for closing the doors, one at a time, and as soon as it is released this lever gravitates of its own accord to its normal or vertical position. With this construction and arrangement, the lever M does not move while the doors are opening, being adapted to remain stationary at this time, and is only moved when the driver desires to close the doors.

With the construction shown and described, it is obvious that either door F can be opened separately and independently of the other, thereby making it possible to discharge one-half of the load in one place, or substantially one-half, depending upon the height of the load in the body, and then to discharge the remainder of the load at some other place, either door being movable so far toward the other that the discharge opening at the bottom of the body is always very nearly the full width between the lower edges of the fixed walls E, so that the load is always dumped midway between the wheels at opposite sides of the wagon. Furthermore, it will be seen that the doors F do not hang down very far when opened, extending downward at this time only a little below the lower edges of the walls E. Again, a single hand lever M is sufficient for closing both doors, simply by one hand on the upper end of this lever, and the opening of the doors is accomplished without danger to the driver occupying the seat, inasmuch as this operation is accompanied by movement of only the hand levers H and I, and without any movement whatever of the means for closing the doors.

Any suitable materials may be employed in the construction of the dump wagon, but with the construction shown and described the box or body A and the frame B are preferably of steel or iron, and it is not necessary to construct any of the parts of wood, whereby a very strong and serviceable dump wagon is provided.

With the construction shown and described, the wagon body is practically divided into two parallel and longitudinally extending compartments, and with the two levers H and I, arranged to work independently of each other, in the manner shown and described, either side of the load can be dumped without dumping the other, so that one side can be dumped in one place along the road or in a field and the other side can then be dumped farther along at some other point. With the inclined bottom walls E, each side of the load is thrown to the center of the roadway—that is to say, the discharge from either side of the wagon box is of such character that practically one-half of the load can be discharged into the middle of the road, and by then driving straight ahead a distance the other side of the load can then also be discharged at the center of the road, so that the two quantities are dumped successively and in line with each other. With this construction, involving a longitudinal division of the load into two quantities or portions, the wagon can be loaded exactly as though the box contained only one compartment, and without the necessity of moving the wagon backward or forward during the loading operation, and notwithstanding that the two side portions of the load can then be dumped separately, one after the other (either door can assume an inclined position directly under the other), practically the same as though two separate and entirely distinct compartments were employed. In other words, a discharge spout can be poised centrally above the wagon box, and the discharge from the spout will fill the body without the necessity of any shifting of the wagon back and forth and without moving the spout relative to the wagon box. The materials being discharged into the wagon will fall on the ridge formed by the pipe or tubular member $f$ at the upper edges of the two swinging doors, and this discharge will be divided thereby and caused to fill the two compartments simultaneously, notwithstanding the fact that either compartment can be discharged independently of the other, or practically so, and in a wagon in which the two portions of the load are arranged side by side and parallel with the longitudinal line of division thereof. As the pipe or tubular member $f$ is in the plane of the lower edges of the sides 3, which latter extend some distance above said plane, it follows that the two longitudinally extending compartments intercommunicate along the longitudinal center of the wagon. With this construction, as will be readily understood, the opening of one door will cause the greater portion of the load to be discharged, as some of the contents of the other compartment will be discharged at this time, and the portion of the load remaining in the wagon will be less than the portion which has been discharged. For example, assuming that the wagon is carrying sand or similar material, it will be seen that the opening of one door will cause a full discharge from one compartment and a partial discharge from the inner side of the other compartment. Of course, the lever M is adapted to remain stationary when both doors are opened simultaneously, but if one door is opened alone it will swing against the weight m and upward toward the other door, thus tilting the lever M over to one side. When one door is opened alone, it can thus swing downward and past the center line of travel of the wagon and upward quite a distance, so that the discharge opening is thus enlarged to some extent to facilitate the dumping of the load.

We do not limit ourselves to the exact construction shown and described.

What we claim as our invention is:

1. In a dump wagon, a body having sides and front and rear ends, a pair of inclined bottom walls arranged with their lower edges extending parallel with the sides of the wagon, a pair of inclined swinging doors hinged at their upper edges to swing downward from the closed positions thereof for dumping the load, each door when closed and one of said walls forming a wedge shaped pocket between them, the two pockets extending longitudinally of said body, so that the load for the full length of the body is discharged from opposite sides thereof, mechanism for releasably locking the lower edges of said doors to the lower edges of said walls, and means substantially as described for closing either door independently of the other, said mechanism including a pair of hand levers arranged to operate in transverse planes and which stand upright one in front of the other when the doors are locked, said means including a single hand lever which stands upright within the body and behind said other levers, a seat on said body in front of said single lever, and means on said seat to hold said locking levers in position, the two levers being separated from the single lever by the front end of the body.

2. In a dump wagon, a body having sides and front and rear ends, a pair of inclined bottom walls arranged with their lower edges extending parallel with the sides of the wagon, a pair of inclined swinging doors hinged at their upper edges to swing downward from the closed positions thereof for dumping the load, each door when closed and one of said walls forming a wedge shaped pocket between them, the two pockets extending longitudinally of said body, so that the load for the full length of the body is discharged from opposite sides thereof, mechanism for releasably locking the lower edges of said doors to the lower edges of said walls, and means substantially as described for closing either door independently of the other, said mechanism including a pair of hand levers having a common pivotal point, and said means including a single hand lever for closing either door, the three levers being arranged one behind the other within reach of the driver at the front of said body, and the axis of said single lever being above said pivotal point.

3. In a dump wagon, a body having a pair of inclined bottom walls, a pair of inclined swinging doors hinged at their upper edges, each door and one of said walls forming a wedge-shaped pocket between them, the two pockets extending longitudinally of said body, mechanism for releasably locking the lower edges of said doors to the lower edges of said walls, and means substantially as described for closing either door independently of the other, said mechanism including a pair of hand-levers which stand upright one in front of the other when the doors are locked, said means including a single hand-lever which stands upright behind said other levers, a seat on said body in front of said single lever, and means on said seat to hold said locking levers in position.

4. In a dump wagon, a body having sides and front and rear ends, a pair of inclined bottom walls arranged with their lower edges extending parallel with the sides of the wagon, a pair of inclined swinging doors hinged at their upper edges to swing downward from the closed positions thereof for dumping the load, each door when closed and one of said walls forming a wedge-shaped pocket between them, the upper edges of said doors being substantially in the plane of the lower edges of the sides of said body, so that the inner and outer sides of each pocket are substantially of the same height, each door being mounted to swing from one side of the wagon past the center line of travel to an inclined position directly under the door at the other side, the two pockets extending longitudinally of said body, so that the load for the full length of the body is discharged from opposite sides thereof, mechanism for releasably locking the lower edges of said doors to the lower edges of said walls and for opening either door independently of the other, thereby to permit either simultaneous or successive discharge of opposite sides of the load, and means for closing either door independently of the other, said mechanism including a rock shaft extending along the lower edge of each bottom wall, and bearings removably mounted on said walls to support said shafts.

5. In a dump wagon, a body having sides and front and rear ends, a pair of inclined bottom walls arranged with their lower edges extending parallel with the sides of the wagon, a pair of inclined swinging doors hinged at their upper edges to swing downward from the closed positions thereof for dumping the load, each door when closed and one of said walls forming a wedge-shaped pocket between them, each door being mounted to swing from one side of the wagon past the center line of travel to an inclined position directly under the door at the other side, the two pockets extending longitudinally of said body, so that the load for the full length of the body is discharged from opposite sides thereof, mechanism for releasably locking the lower edges of said doors to the lower edges of said walls and for opening either door independently of the other, thereby to permit either simultaneous or successive discharge of opposite sides of the load, and means for closing either door independently of the other, said doors having angle irons extending along the lower edges thereof, and said mechanism including a rock shaft having eye-bolt bearings removably secured to said angle irons, each shaft being a square rod with round portions for said bearings, and angle pieces secured to the square portions of said shafts to engage said doors.

6. In a dump wagon, a body having sides and front and rear ends, a pair of inclined bottom walls arranged with their lower edges extending parallel with the sides of the wagon, a pair of inclined swinging doors hinged at their upper edges to swing downward from the closed positions thereof for dumping the load, each door when closed and one of said walls forming a wedge-shaped pocket between them, the two pockets extending longitudinally of said body, so that the load for the full length of the body is discharged from opposite sides thereof, mechanism for releasably locking the lower edges of said doors to the lower edges of said walls and for opening either door independently of the other, thereby to permit either simultaneous or successive discharge of opposite sides of the load, and means for closing either door independently of the other, said means including a single hand lever disposed behind said front end of the body and arranged for closing either door, and said mechanism including a pair of hand levers which are both movable to one and the same side of the wagon to open said doors.

7. In a dump wagon, a body having sides and front and rear ends, a pair of inclined bottom walls arranged with their lower edges extending parallel with the sides of the wagon, a pair of inclined swinging doors hinged at their upper edges to swing downward from the closed positions thereof for dumping the load, each door when closed and one of said walls forming a wedge-shaped pocket between them, each door being mounted to swing from one side of the wagon past the center line of travel to an inclined position directly under the door at the other side, the two pockets extending longitudinally of said body, so that the load for the full length of the body is discharged from opposite sides thereof, mechanism operating about parallel longitudinal axes for releasably locking the lower edges of said doors to the lower edges of said walls and for opening either door independently of the other, thereby to permit either simultaneous or successive discharge of opposite sides of the load, and means for closing either door independently of the other, said doors having a common axis about which they swing downward and toward each other to dump the load, said means including a single hand lever mounted on the end of said axis and provided with a lower end portion for engaging either door, and said mechanism including a pair of hand levers which are pivotally mounted and both movable to one and the same side of the wagon to open said doors.

8. In a dump wagon, a body having sides and front and rear ends, a pair of inclined bottom walls arranged with their lower edges extending parallel with the sides of the wagon, a pair of inclined swinging doors hinged at their upper edges to swing downward from the closed positions thereof for dumping the load, each door when closed and one of said walls forming a wedge-shaped pocket between them, the two pockets extending longitudinally of said body and intercommunicating along their full length above said doors, so that the load for the full length of the body is discharged from opposite sides thereof, mechanism operating about three relatively fixed parallel axes for releasably locking the lower edges of said doors to the lower edges of said walls and for opening either door independently of the other, thereby to permit either simultaneous or successive discharge of opposite sides of the load, and means for closing either door independently of the other, said means including a single hand lever and an element operated thereby about the axis of said doors to engage the bottom of either door, and said mechanism including a pair of hand levers which are both movable to one and the same side of the wagon to open said doors.

9. In a dump wagon, a body having sides and front and rear ends, a pair of inclined bottom walls arranged with their lower edges extending parallel with the sides of the wagon, a pair of inclined swinging doors hinged at their upper edges to swing downward from their closed positions thereof for dumping the load, each door when closed and one of said walls forming a wedge-shaped pocket between them, the two pockets having an inverted wedge-shaped space between them and extending longitudinally of said body, so that the load for the full length of the body is discharged from opposite sides thereof, mechanism for releasably locking the lower edges of said doors to the lower edges of said walls and for opening either door independently of the other, thereby to permit either simultaneous or successive discharge of opposite sides of the load, and means for closing either door independently of the other, said means including a single hand lever which is weighted at the lower end thereof to directly engage the doors and gravitate when released into a vertical position midway between said doors, and said mechanism including a pair of hand levers which are both movable to one and the same side of the wagon to open said doors.

10. In a dump wagon, a body having sides and front and rear ends, a pair of inclined bottom walls arranged with their lower edges extending parallel with the sides of the wagon, a pair of inclined swinging doors hinged at their upper edges to swing downward from the closed positions thereof for dumping the load, each door when closed and one of said walls forming a wedge-shaped pocket between them, the two pockets extending parallel and longitudinally of said body, so that the load for the full length of the body is discharged from opposite sides thereof, mechanism for releasably locking the lower edges of said doors to the lower edges of said walls and for opening either door independently of the other, thereby to permit either simultaneous or successive discharge of opposite sides of the load, and means against which the doors swing when released and for closing either door independently of the other, said means including a single hand lever which is pivoted to swing laterally of the wagon and movable relative to said mechanism and doors, and said mechanism including a pair of hand levers which are both movable to one and the same side of the wagon to open said doors.

11. In a dump wagon, a body having a pair of inclined bottom walls arranged with their lower edges extending parallel with the sides of the wagon, a pair of inclined swinging doors hinged at their upper edges to swing downward from the closed positions thereof for dumping the load, each door when closed and one of said walls forming a wedge-shaped pocket between them, the two pockets extending longitudinally of said body, so that the load for the full length of the body is discharged from opposite sides thereof, mechanism controllable from the front seat of the wagon and arranged for releasably locking the lower edges of said doors to the lower edges of said walls and for opening either door independently of the other, thereby to permit either simultaneous or successive discharge of opposite sides of the load, and means for closing either door independently of the other, said means being constructed and arranged to remain stationary while the doors are swinging downward toward each other and to swing with either door when one is opened while the other remains closed.

Signed by us at Manchester, Iowa, this 11 day of Sept. 1915.

OBADIAH A. DUNHAM.
SEVER K. CLEVEN.

Copies of this patent may be obtained for five cents each, by addressing the "Commissioner of Patents, Washington, D. C."